US009729216B2

(12) United States Patent
Yang et al.

(10) Patent No.: US 9,729,216 B2
(45) Date of Patent: Aug. 8, 2017

(54) MULTIPLE TRANSMITTER CODEBOOK METHODS AND DEVICES

(71) Applicant: Nokia Technologies Oy, Espoo (FI)

(72) Inventors: Weidong Yang, Hoffman Estates, IL (US); Bishwarup Mondal, Beavercreek, OH (US); Eugene Visotsky, Buffalo Grove, IL (US); Klaus Hugl, Vienna (AT)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/768,650

(22) PCT Filed: Mar. 7, 2014

(86) PCT No.: PCT/US2014/022029
§ 371 (c)(1),
(2) Date: Aug. 18, 2015

(87) PCT Pub. No.: WO2014/138656
PCT Pub. Date: Sep. 12, 2014

(65) Prior Publication Data
US 2016/0006494 A1 Jan. 7, 2016

Related U.S. Application Data

(60) Provisional application No. 61/775,284, filed on Mar. 8, 2013, provisional application No. 61/825,088, filed on May 19, 2013.

(51) Int. Cl.
*H04L 12/28* (2006.01)
*H04B 1/56* (2006.01)
(Continued)

(52) U.S. Cl.
CPC ......... *H04B 7/0456* (2013.01); *H04B 7/0452* (2013.01); *H04L 25/0391* (2013.01)

(58) Field of Classification Search
CPC .......................... H04B 7/0456; H04B 7/0452
See application file for complete search history.

(56) References Cited

U.S. PATENT DOCUMENTS

2012/0218948 A1    8/2012  Onggosanusi et al.
2014/0177745 A1*   6/2014  Krishnamurthy .... H04B 7/0413
                                                      375/267
(Continued)

OTHER PUBLICATIONS

International Search Report and Written Opinion received for corresponding Patent Cooperation Treaty Application No. PCT/US2014/022029, dated May 19, 2014, 13 pages.
(Continued)

*Primary Examiner* — Faruk Hamza
*Assistant Examiner* — Abu-Sayeed Haque
(74) *Attorney, Agent, or Firm* — Nokia Technologies Oy

(57) ABSTRACT

Various communication systems may benefit from codebook methods and devices for multiple transmitters. For example, a codebook for four transmitters (4Tx) may provide further enhancement for downlink multiple-input multiple-output (DL-MIMO) systems. A method can include weighting a signal for transmission based on a precoder selected according to a feedback from a codebook, such as codebooks A, B, C, D, or E, described herein. The method can also include sending the weighted signal.

18 Claims, 3 Drawing Sheets

(51) Int. Cl.
*H04B 7/00* (2006.01)
*H04J 3/16* (2006.01)
*H04B 7/0456* (2017.01)
*H04L 25/03* (2006.01)
*H04B 7/0452* (2017.01)

(56) References Cited

U.S. PATENT DOCUMENTS

| | | | |
|---|---|---|---|
| 2014/0198868 | A1 | 7/2014 | Yang et al. |
| 2014/0245095 | A1* | 8/2014 | Nammi ............... H04L 1/1845 714/749 |
| 2015/0003553 | A1* | 1/2015 | Nammi ............... H04B 7/0456 375/267 |

OTHER PUBLICATIONS

Nokia Siemens Networks et al.: "Proposal for 4Tx Codebook Enhancement", 3GPP TSG-RAN WG1 Meeting #72, St. Julian's, Malta, Jan. 28-Feb. 1, 2013, 6 pages.
Catt, "Evaluation of 4Tx Codebook Enhancement for DL MINO", 3GPP TSG RAN WG1 Meeting #66bis, Zhuhai, China, Oct. 10-14, 2011, 6 pages.
"Way Forward on 8Tx Codebook for Rel.10 DL MIMO", 3GPP TSG RAN WG1 62, R1-104473, Agenda Item: 6.3.3, Alcatel-Lucent, Aug. 23-27, 2010, 6 pages.
A Case for WI Proposal "Further Downlink MIMO Enhancement for LTE-Advanced", 3GPP TSG RAN Meeting #55, RP-120209, Agenda Item: 13.1, AT&T, Feb. 28-Mar. 2, 2012, pp. 1-2.
"Potential Improvements for FE_DL-MIMO", 3GPP TSG RAN WG1 Meeting #72, R1-130664, Agenda Item: 7.3.2, AT&T, Jan. 28-Feb. 1, 2013, pp. 1-2.
"4Tx Codebook Enhancement for ReL.12", Texas Instruments, Feb. 27, 2013, pp. 1-17.
"DL-Mimo Enhancement for 4Tx in Rel 11", AT&T Labs, 2010, 11 pages.
"3rd Generation Partnership Project; Technical Specification Group Radio Access Network; Evolved Universal Terrestrial Radio Access (E-UTRA); Downlink Multiple Input Multiple Output (MIMO) enhancement for LTE-Advanced (Release 11)", 3GPP TR 36.871, V11.0.0, Dec. 2011, pp. 1-17.
"Remaining Details of Rank 1/2 Codebook", 3GPP TSG-RAN WG1 #73, R1-131911, Agenda item: 6.2.2.1.1, Intel corporation, May 20-24, 2013, pp. 1-4.
"Proposal for 4Tx Enhanced Codebook", 3GPP TSG RAN WG1 Meeting #72bis, R1-131797, Agenda Item: 7.2.2.1, Fujitsu, Apr. 15-19, 2013, pp. 1-3.
"On 4Tx Codebook Enhancement in Rel.12", 3GPP TSG RAN WG1 #72bis, R1-131805, Agenda item: 7.2.2.1, Texas Instruments, Apr. 15-19, 2013, 2 pages.
"Proposal on 4tx codebook for DL MIMO enhancement", 3GPP TSG RAN WG1 Meeting #72bis, R1-131809, Agenda Item: 7.2.2.1, LG Electronics, Apr. 15-19, 2013, 2 pages.
"3rd Generation Partnership Project; Technical Specification Group Radio Access Network; Evolved Universal Terrestrial Radio Access (E-UTRA); Physical channels and modulation (Release 12)", 3GPP TS 36.211, V12.0.0, Dec. 2013, pp. 1-120.
"3rd Generation Partnership Project; Technical Specification Group Radio Access Network; Evolved Universal Terrestrial Radio Access (E-UTRA); Physical layer procedures (Release 12)", 3GPP TS 36.213, V12.0.0, Dec. 2013, pp. 1-186.
"Way Forward of 4Tx Rank 1 and 2 Codebook Design for Downlink MIMO Enhancement in Rel-12", 3GPP TSG RAN WG1 #73, R1-132738, Agenda item: 6.2.2.1.1, Alcatel-Lucent, May 20-24, 2013, 9 pages.
"3rd Generation Partnership Project; Technical Specification Group Radio Access Network; Evolved Universal Terrestrial Radio Access (E-UTRA); Physical layer procedures (Release 11)", 3GPP TS 36.213, V11.11.0, Jun. 2015, pp. 1-183.
"3rd Generation Partnership Project; Technical Specification Group Radio Access Network; Evolved Universal Terrestrial Radio Access (E-UTRA); Physical layer procedures (Release 10)", 3GPP TS 36.213, V10.13.0, Jun. 2015, pp. 1-128.
"3rd Generation Partnership Project; Technical Specification Group Radio Access Network; Evolved Universal Terrestrial Radio Access (E-UTRA); Multiplexing and channel coding (Release 11)", 3GPP TS 36.212, V11.5.1, Sep. 2014, pp. 1-84.
"3rd Generation Partnership Project; Technical Specification Group Radio Access Network; Evolved Universal Terrestrial Radio Access (E-UTRA); Multiplexing and channel coding (Release 10)", 3GPP TS 36.212, V10.8.0, Jun. 2013, pp. 1-79.

* cited by examiner

MULTIPLE TRANSMITTER CODEBOOK METHODS AND DEVICES

CROSS-REFERENCE TO RELATED APPLICATION

This application was originally filed as Patent Cooperation Treaty Application No. PCT/US2014/022029 filed Mar. 7, 2014 which claims priority benefit to U.S. Provisional Patent Application No. 61/775,284 filed Mar. 8, 2013, and U.S. Provisional Patent Application No. 61/825,088, filed May 19, 2013, each of which is hereby incorporated herein by reference in its entirety.

BACKGROUND

Field

Various communication systems may benefit from codebook methods and devices for multiple transmitters. For example, a codebook for four transmitters (4Tx) may provide further enhancement for downlink multiple-input multiple-output (DL-MIMO) systems.

Description of the Related Art

Downlink multiple-input multiple-output (DL-MIMO) can be supported in a variety of ways, for example with the transparent method described in U.S. patent application Ser. No. 14/158,035, filed Jan. 17, 2014, the entirety of which is hereby incorporated herein by reference. The transparent method for four transmitters (4Tx) may rely on an eight transmitter (8Tx) channel state information (CSI) feedback scheme.

However, 8TX codebook support as such may be limited to Transmission Mode (TM) 9/10. Also, 8TX codebook (CB) support from a user equipment (UE) point of view is currently an optional feature.

In Rel-10 8Tx codebook design, the beam granularity for ranks 3 and 4 is different from that for ranks 1 and 2 and the beam granularity for rank 1 is the same as that for rank 2. In Rel-12, it may be that precoders will be included that are matched to large angle spread and small angle spread in the codebook so the codebook's performance is robust for different propagation scenarios.

The long term evolution (LTE) Rel-10 8Tx codebook is a so-called "dual codebook" in the sense that each codeword is defined as a product of two matrices, the first matrix comes from codebook one ($C_1$), and the second matrix comes from codebook two ($C_2$). Refer to 3GPP R1-104473, "Way forward on 8Tx Codebook for Rel.10 DL MIMO", 23-27 Aug. 2010, Madrid, Spain, which is hereby incorporated herein by reference in its entirety.

$C_1$ can be defined as follows. First, a 4×32 matrix B can be defined as $B = [b_0 \ b_1 \ \ldots \ b_{31}]$, and elements of B can be defined as $$[B]_{1+m,1+n} = e^{j\frac{2\pi mn}{32}},$$

m=0, 1, 2, 3, n=0, 1, ..., 31.

$X^{(k)} \in \{[b_{2k \bmod 32} \ b_{(2k+1) \bmod 32} \ b_{(2k+2) \bmod 32} \ b_{(2k+3) \bmod 32}]$, k=0, 1, ..., 15}; and $X^{(k)}$ can be a 4×4 matrix.

Moreover, $W_1$ can be defined as $$W_1^{(k)} = \begin{bmatrix} X^{(k)} & \\ & X^{(k)} \end{bmatrix}_{8 \times 8},$$

such that codebook 1 is defined as $C_1 = \{W_1^{(0)}, W_1^{(1)}, W_1^{(2)}, \ldots, W_1^{(15)}\}$.

For rank 1 and rank 2, $C_2$ can be defined differently. Thus, for rank 1:

$$W_2 \in C_2 = \left\{ \frac{1}{\sqrt{2}} \begin{bmatrix} Y \\ Y \end{bmatrix}, \frac{1}{\sqrt{2}} \begin{bmatrix} Y \\ jY \end{bmatrix}, \frac{1}{\sqrt{2}} \begin{bmatrix} Y \\ -Y \end{bmatrix}, \frac{1}{\sqrt{2}} \begin{bmatrix} Y \\ -jY \end{bmatrix} \right\},$$

$Y \in \{\tilde{e}_1, \tilde{e}_2, \tilde{e}_3, \tilde{e}_4\}$.

However, for rank 2:

$$W_2 \in C_2 = \left\{ \frac{1}{\sqrt{2}} \begin{bmatrix} Y_1 & Y_2 \\ Y_1 & -Y_2 \end{bmatrix}, \frac{1}{\sqrt{2}} \begin{bmatrix} Y_1 & Y_2 \\ jY_1 & -jY_2 \end{bmatrix} \right\}$$

and $(Y_1, Y_2) \in$ $\{(\tilde{e}_1, \tilde{e}_1), (\tilde{e}_2, \tilde{e}_2), (\tilde{e}_3, \tilde{e}_3), (\tilde{e}_4, \tilde{e}_4), (\tilde{e}_1, \tilde{e}_2), (\tilde{e}_2, \tilde{e}_3), (\tilde{e}_1, \tilde{e}_4), (\tilde{e}_2, \tilde{e}_4)\}$ where $$\tilde{e}_1 = \begin{bmatrix} 1 \\ 0 \\ 0 \\ 0 \end{bmatrix}, \tilde{e}_2 = \begin{bmatrix} 0 \\ 1 \\ 0 \\ 0 \end{bmatrix}, \tilde{e}_3 = \begin{bmatrix} 0 \\ 0 \\ 1 \\ 0 \end{bmatrix}, \tilde{e}_4 = \begin{bmatrix} 0 \\ 0 \\ 0 \\ 1 \end{bmatrix}.$$

Various assumptions may be used in codebook design for communication systems. For example, a new aperiodic physical uplink shared channel (PUSCH) feedback mode may be supported. The feedback can include channel quality indicator (CQI) and rank feedback bit size as in PUSCH Mode 3-1 in release (Rel) 10 of the third generation partnership project (3GPP). The feedback can also include a wideband precoding matrix indicator (PMI), which includes, for two transmitters (2Tx): 0 bit, for 4Tx: various possibilities, for 8TX: 4/4/2/2/2/2/2/0 bits for rank 1-8 respectively. The feedback may also include per subband PMI(s), for 2Tx: 2/1 bits for rank 1-2, 4Tx: various possibilities, for 8Tx: 4/4/4/3/0/0/0/0 bits for rank 1-8 respectively.

It may also be assumed that a Rel 10 dual codebook structure ($W = W_1 W_2$) can be used in new codebook in Release 12 for 4 antenna feedback for demodulation reference signal (DMRS) based TMs. Other features may vary, such as subband size and the detailed $W_1$ and $W_2$ structures. For example, $W_1$ can correspond to a long term and/or wideband channel properties and $W_2$ can correspond to a short-term and narrowband channel. Likewise, there may be additional information in the CSI reports for this new feedback mode. For example, there may be CSI feedback enhancements targeted at improving multi-user (MU) performance. Furthermore, Rel-10 4tx codebook can be also expressed with the dual codebook structure ($W = W_1 W_2$) with $W_1$ being the identity matrix.

The following codebook structure is defined for Rel-10. For all ranks 1 to 8, $W_1 = [X \ 0; 0 \ X]$, which is block diagonal, $W = W_1 * W_2$, with block diagonal W1 matching the spatial covariance of dual-polarized antenna setup with any spacing (e.g. 1/2 wavelength or 4 wavelength), with at least sixteen 8Tx discrete Fourier transform (DFT) vectors generated from $W_1$ and co-phasing via $W_2$ matching the spatial covariance of ULA antenna setup, and with good performance for high and low spatial correlation. For rank 1 to 4: X is 4xNb matrix. Moreover, there can be 32 4Tx DFT beams for X. Furthermore, the beam index can be 0, 1, 2, ..., 31.

Furthermore, for each W1, adjacent overlapping beams can be used to reduce edge effect in frequency-selective precoding, and thus ensure the same $W_1$ is "optimal" for sub-bands with potentially different $W_2$.

For rank 1 and 2, W1 Nb=4 adjacent overlapping beams with eight W1 matrices per rank: {0,1,2,3}, {2,3,4,5}, {4,5,6,7}, ..., {28,29,30,31}, {30,31,0,1}. Moreover, beam selection and co-phasing can be supported by W2, which can provide 16 combinations at rank 1 and rank 2 respectively (at rank 1, 4 beam selection choices and 4 QPSK co-phasing choices lead to 16 combinations, and at rank 2, 8 beam selection choices and 2 QPSK co-phasing choices lead to 16 combinations).

In 3GPP TS 36.213 (Rel-10 and Rel-11) and TS 36.212 (Rel-10 and Rel-11), to use the dual codebook in the periodic feedback mode 1-1, two submodes (submode 1 and submode 2) with codebook subsampling are introduced. Also, to support the dual codebook in the periodic mode 2-1, codebook subsampling is used for rank 2, rank 3 and rank 4 (for rank 1, there are enough bits for both $W_1$ and $W_2$, subsampling is not used). "Subsampling" here means in a codebook only some combinations of $W_1$ and $W_2$ are eligible to be selected by a user equipment in a feedback mode so there are fewer bits needed to represent $W_1$ and $W_2$.

As the beam group definition is identical for rank 1 and rank 2 in the Rel-10 8Tx codebook, the subsampling is identical for both in submode 1 and submode 2 of periodic feedback mode 1-1.

SUMMARY

According to certain embodiments, a method can include weighting a signal for transmission based on a precoder selected according to a feedback from a codebook constructed from a rotation matrix D as a function of $\theta$ as follows $$D = \begin{bmatrix} \angle 0° & & & \\ & \angle \theta° & & \\ & & \angle 0° & \\ & & & \angle \theta° \end{bmatrix}$$

where $\theta$ is a design parameter and a construction matrix V defined as $$V = [v_1 \ v_2 \ v_3 \ v_4] = \begin{bmatrix} \angle 0° & \angle 0° & \angle 0° & \angle 0° \\ \angle 0° & \angle \beta - \alpha & \angle \beta + \alpha & \angle 2\beta \end{bmatrix}$$

where $\alpha$ and $\beta$ are design parameters. The method can also include sending the weighted signal.

In certain embodiments, a method can include receiving a weighted signal. The method can also include searching the weighted signal based on a codebook constructed from a rotation matrix D as a function of $\theta$ as follows $$D = \begin{bmatrix} \angle 0° & & & \\ & \angle \theta° & & \\ & & \angle 0° & \\ & & & \angle \theta° \end{bmatrix}$$

where $\theta$ is a design parameter and wherein the codebook is constructed from a construction matrix V defined as $$V = [v_1 \ v_2 \ v_3 \ v_4] = \begin{bmatrix} \angle 0° & \angle 0° & \angle 0° & \angle 0° \\ \angle 0° & \angle \beta - \alpha & \angle \beta + \alpha & \angle 2\beta \end{bmatrix}$$

where $\alpha$ and $\beta$ are design parameters.

An apparatus, according to certain embodiments, means for weighting a signal for transmission based on a precoder selected according to a feedback from a codebook constructed from a rotation matrix D as a function of $\theta$ as follows $$D = \begin{bmatrix} \angle 0° & & & \\ & \angle \theta° & & \\ & & \angle 0° & \\ & & & \angle \theta° \end{bmatrix}$$

where $\theta$ is a design parameter and wherein the codebook is constructed from a construction matrix V defined as $$V = [v_1 \ v_2 \ v_3 \ v_4] = \begin{bmatrix} \angle 0° & \angle 0° & \angle 0° & \angle 0° \\ \angle 0° & \angle \beta - \alpha & \angle \beta + \alpha & \angle 2\beta \end{bmatrix}$$

where $\alpha$ and $\beta$ are design parameters. The apparatus also includes means for sending the weighted signal.

An apparatus, in certain embodiments, means for receiving a weighted signal. The apparatus also includes means for searching the weighted signal based on a codebook constructed from a rotation matrix D as a function of $\theta$ as follows $$D = \begin{bmatrix} \angle 0° & & & \\ & \angle \theta° & & \\ & & \angle 0° & \\ & & & \angle \theta° \end{bmatrix}$$

where $\theta$ is a design parameter and wherein the codebook is constructed from a construction matrix V defined as $$V = [v_1 \ v_2 \ v_3 \ v_4] = \begin{bmatrix} \angle 0° & \angle 0° & \angle 0° & \angle 0° \\ \angle 0° & \angle \beta - \alpha & \angle \beta + \alpha & \angle 2\beta \end{bmatrix}$$

where $\alpha$ and $\beta$ are design parameters.

According to certain embodiments, an apparatus includes at least one processor and at least memory including computer program code. The at least one memory and the computer program code can be configured to, with the at least one processor, cause the apparatus at least to weight a signal for transmission based on a precoder selected according to a feedback from a codebook constructed from a rotation matrix D as a function of $\theta$ as follows $$D = \begin{bmatrix} \angle 0° & & & \\ & \angle \theta° & & \\ & & \angle 0° & \\ & & & \angle \theta° \end{bmatrix}$$

where θ is a design parameter and wherein the codebook is constructed from a construction matrix V defined as $$V = [v_1 \quad v_2 \quad v_3 \quad v_4] = \begin{bmatrix} \angle 0° & \angle 0° & \angle 0° & \angle 0° \\ \angle 0° & \angle \beta - \alpha & \angle \beta + \alpha & \angle 2\beta \end{bmatrix}$$

where α and β are design parameters. The at least one memory and the computer program code can also be configured to, with the at least one processor, cause the apparatus at least to send the weighted signal.

In certain embodiments, an apparatus can include at least one processor and at least memory including computer program code. The at least one memory and the computer program code can be configured to, with the at least one processor, cause the apparatus at least to receive a weighted signal. The at least one memory and the computer program code can also be configured to, with the at least one processor, cause the apparatus at least to search the weighted signal based on a codebook constructed from a rotation matrix D as a function of θ as follows $$D = \begin{bmatrix} \angle 0° & & & \\ & \angle \theta° & & \\ & & \angle 0° & \\ & & & \angle \theta° \end{bmatrix}$$

where θ is a design parameter and wherein the codebook is constructed from a construction matrix V defined as $$V = [v_1 \quad v_2 \quad v_3 \quad v_4] = \begin{bmatrix} \angle 0° & \angle 0° & \angle 0° & \angle 0° \\ \angle 0° & \angle \beta - \alpha & \angle \beta + \alpha & \angle 2\beta \end{bmatrix}$$

where α and β are design parameters.

A system, according to certain embodiments can include a first apparatus and a second apparatus. The first apparatus can include means for weighting a signal for transmission based on a precoder selected according to a feedback from a codebook constructed from a rotation matrix D as a function of θ as follows $$D = \begin{bmatrix} \angle 0° & & & \\ & \angle \theta° & & \\ & & \angle 0° & \\ & & & \angle \theta° \end{bmatrix}$$

where θ is a design parameter and wherein the codebook is constructed from a construction matrix V defined as $$V = [v_1 \quad v_2 \quad v_3 \quad v_4] = \begin{bmatrix} \angle 0° & \angle 0° & \angle 0° & \angle 0° \\ \angle 0° & \angle \beta - \alpha & \angle \beta + \alpha & \angle 2\beta \end{bmatrix}$$

where α and β are design parameters. The first apparatus can also include means for sending the weighted signal. The second apparatus can include means for receiving the weighted signal. The second apparatus can also include means for searching the weighted signal based on the codebook constructed from the rotation matrix D, wherein the codebook is constructed from a construction matrix V.

According to certain embodiments, a method can include determining a feedback signal for transmission based on a precoder selected according to a codebook constructed from a rotation matrix D as a function of θ as follows $$D = \begin{bmatrix} \angle 0° & & & \\ & \angle \theta° & & \\ & & \angle 0° & \\ & & & \angle \theta° \end{bmatrix}$$

where θ is a design parameter and wherein the codebook is constructed from a construction matrix V defined as $$V = [v_1 \quad v_2 \quad v_3 \quad v_4] = \begin{bmatrix} \angle 0° & \angle 0° & \angle 0° & \angle 0° \\ \angle 0° & \angle \beta - \alpha & \angle \beta + \alpha & \angle 2\beta \end{bmatrix},$$

where α and β are design parameters. The method can also include sending the feedback signal.

In certain embodiments, an apparatus can include at least one processor and at least memory including computer program code. The at least one memory and the computer program code can be configured to, with the at least one processor, cause the apparatus at least to determine a feedback signal for transmission based on a precoder selected according to a codebook constructed from a rotation matrix D as a function of θ as follows $$D = \begin{bmatrix} \angle 0° & & & \\ & \angle \theta° & & \\ & & \angle 0° & \\ & & & \angle \theta° \end{bmatrix}$$

where θ is a design parameter and wherein the codebook is constructed from a construction matrix V defined as $$V = [v_1 \quad v_2 \quad v_3 \quad v_4] = \begin{bmatrix} \angle 0° & \angle 0° & \angle 0° & \angle 0° \\ \angle 0° & \angle \beta - \alpha & \angle \beta + \alpha & \angle 2\beta \end{bmatrix},$$

where α and β are design parameters. The at least one memory and the computer program code can also be configured to, with the at least one processor, cause the apparatus at least to send the feedback signal.

An apparatus, according to certain embodiments, can include means for determining a feedback signal for transmission based on a precoder selected according to a codebook constructed from a rotation matrix D as a function of θ as follows $$D = \begin{bmatrix} \angle 0° & & & \\ & \angle \theta° & & \\ & & \angle 0° & \\ & & & \angle \theta° \end{bmatrix}$$

where θ is a design parameter and wherein the codebook is constructed from a construction matrix V defined as $$V = [v_1 \ v_2 \ v_3 \ v_4] = \begin{bmatrix} \angle 0° & \angle 0° & \angle 0° & \angle 0° \\ \angle 0° & \angle \beta - \alpha & \angle \beta + \alpha & \angle 2\beta \end{bmatrix},$$

where α and β are design parameters. The apparatus can also include means for sending the feedback signal.

BRIEF DESCRIPTION OF THE DRAWINGS

For proper understanding of the invention, reference should be made to the accompanying drawings, wherein.

DETAILED DESCRIPTION

Figure 1:
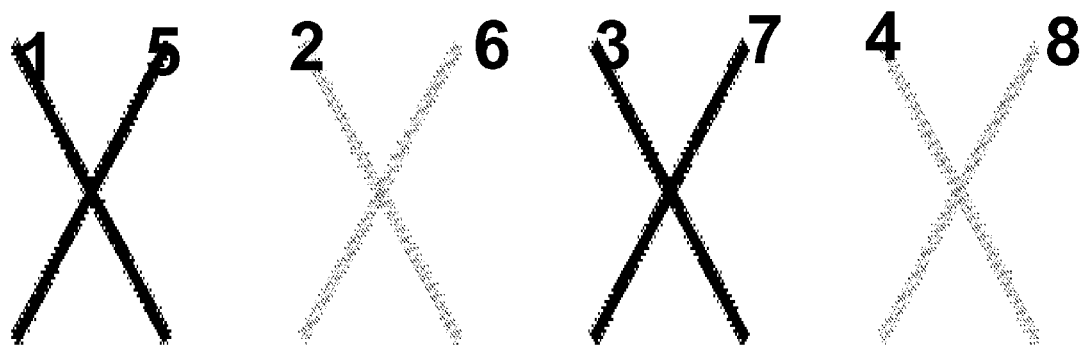
FIG. 1 illustrates reference antenna port numbering according to certain embodiments.

According to certain embodiments, a codebook can be expressed as described below. In the following, the description focuses on codebooks of rank 1 and rank 2. This may be particularly applicable to the case where there are two receive antennas on the UE side. Nevertheless, one skilled in the art will comprehend that the described construction can also be applied to higher rank codebooks as well.

According to certain embodiments, a codebook has the dual codebook structure (also referred as "double codebook structure") as in Rel-10 8Tx codebook. For example, at each rank the final codebook is defined with two codebooks $C_1$ and $C_2$.

$C_1$ can be defined using two matrices, V and D. There are at least two alternatives to specify V. According to a first alternative, $$V = [v_1 \ v_2 \ v_3 \ v_4] = \begin{bmatrix} 1 & 1 & 1 & 1 \\ 1 & e^{\frac{j(\beta-\alpha)\pi}{180}} & e^{\frac{j(\beta+\alpha)\pi}{180}} & e^{\frac{j2\beta\pi}{180}} \end{bmatrix}_{2\times 4}$$

or $$V = [v_1 \ v_2 \ v_3 \ v_4] = \begin{bmatrix} 1 & 1 & 1 & 1 \\ 1 & e^{\frac{j\alpha\pi}{180}} & e^{\frac{j2\alpha\pi}{180}} & e^{\frac{j3\alpha\pi}{180}} \end{bmatrix}_{2\times 4}$$

According to a second alternative, $$V = [v_1 \ v_2 \ v_3 \ v_4] = \begin{bmatrix} 1 & 1 & 1 & 1 \\ e^{\frac{-j\beta\pi}{180}} & e^{\frac{-j\alpha\pi}{180}} & e^{\frac{j\alpha\pi}{180}} & e^{\frac{j\beta\pi}{180}} \end{bmatrix}_{2\times 4}$$

or $$V = [v_1 \ v_2 \ v_3 \ v_4] = \begin{bmatrix} 1 & 1 & 1 & 1 \\ e^{\frac{-j3/2\alpha\pi}{180}} & e^{\frac{-j1/2\alpha\pi}{180}} & e^{\frac{j1/2\alpha\pi}{180}} & e^{\frac{j3/2\alpha\pi}{180}} \end{bmatrix}_{2\times 4}.$$

Either one of these may be sufficient, as one alternative can be obtained from another by applying phase rotations (or beam centering) on different antennas of a base station for both channel state information (CSI) feedback and data transmission (PDSCH).

$$D = \begin{bmatrix} 1 & & & \\ & e^{\frac{j\pi\theta}{180}} & & \\ & & 1 & \\ & & & e^{\frac{j\pi\theta}{180}} \end{bmatrix}$$

where θ, α and β are design parameters, which can be expressed as angles in degrees.

Furthermore, $W_1$ can be defined as $$W_1^{(k)} = D^k \begin{bmatrix} V \\ V \end{bmatrix}$$

And codebook 1 can thus be defined as $C_1 = \{W_1^{(0)}, W_1^{(1)}, W_1^{(2)}, \ldots, W_1^{(M-1)}\}$, where M is a design parameter, which controls the size of $C_1$.

In summary, design parameters for codebook $C_1$ can include θ,α,β and M.

The codebook $C_2$ can be the same as that for the 8Tx codebook in LTE Rel.-10. Thus, $C_2$ can be defined, for rank 1, as $$W_2 \in C_2 = \left\{ \frac{1}{\sqrt{2}} \begin{bmatrix} Y \\ Y \end{bmatrix}, \frac{1}{\sqrt{2}} \begin{bmatrix} Y \\ jY \end{bmatrix}, \frac{1}{\sqrt{2}} \begin{bmatrix} Y \\ -Y \end{bmatrix}, \frac{1}{\sqrt{2}} \begin{bmatrix} Y \\ -jY \end{bmatrix} \right\},$$

$Y \in \{\tilde{e}_1, \tilde{e}_2, \tilde{e}_3, \tilde{e}_4\}.$ $C_2$ can be defined, for rank 2, as $$W_2 \in C_2 = \left\{ \frac{1}{\sqrt{2}} \begin{bmatrix} Y_1 & Y_2 \\ Y_1 & -Y_2 \end{bmatrix}, \frac{1}{\sqrt{2}} \begin{bmatrix} Y_1 & Y_2 \\ jY_1 & -jY_2 \end{bmatrix} \right\}$$

and $(Y_1, Y_2) \in \{(\tilde{e}_1, \tilde{e}_1), (\tilde{e}_2, \tilde{e}_2), (\tilde{e}_3, \tilde{e}_3),$ $(\tilde{e}_4, \tilde{e}_4), (\tilde{e}_1, \tilde{e}_2), (\tilde{e}_2, \tilde{e}_3), (\tilde{e}_1, \tilde{e}_4), (\tilde{e}_2, \tilde{e}_4)\}$ where $$\tilde{e}_1 = \begin{bmatrix} 1 \\ 0 \\ 0 \\ 0 \end{bmatrix}, \tilde{e}_2 = \begin{bmatrix} 0 \\ 1 \\ 0 \\ 0 \end{bmatrix}, \tilde{e}_3 = \begin{bmatrix} 0 \\ 0 \\ 1 \\ 0 \end{bmatrix}, \tilde{e}_4 = \begin{bmatrix} 0 \\ 0 \\ 0 \\ 1 \end{bmatrix}.$$

The design parameters for codebook $C_1$ can include θ,α,β and M, as mentioned above. Codebooks, for $C_1$, taking values as in the following table have been found to perform well for both closely spaced 4 transmit antennas and widely-spaced 4 transmit antennas:

TABLE 1

| Codebook (for $C_1$) | θ | α | β | M |
|---|---|---|---|---|
| Codebook A | 22.5° | −135° | −45° | 16 |
| Codebook B | 22.5° | −137.8125° | −53.4375° | 16 |
| Codebook C | 22.5° | 45° | 135° | 16 |
| Codebook D | 22.5° | 135° | 45° | 16 |
| Codebook E | 22.5° | −45° | −135° | 16 |

Two examples are provided below, corresponding to codebooks A and B, respectively. Using new codebook A for $C_1$, can yield $$D = \begin{bmatrix} 1 & \\ & \angle 22.5° \end{bmatrix}$$

and a construction matrix $$V = [v_1 \; v_2 \; v_3 \; v_4] = \begin{bmatrix} 1 & 1 & 1 & 1 \\ \angle 45° & \angle 135° & \angle -135° & \angle -45° \end{bmatrix}$$

where $\angle 45°$ is the angle notation for $$e^{\frac{j\pi \cdot 45}{180}},$$

similarly for other angles.

Similarly, using new codebook B for $C_1$, can yield $$D = \begin{bmatrix} 1 & \\ & \angle 22.5° \end{bmatrix}$$

and a construction matrix $$V = [v_1 \; v_2 \; v_3 \; v_4] =$$
$$\begin{bmatrix} 1 & 1 & 1 & 1 \\ \angle 53.4375° & \angle 137.8125° & \angle -137.8125° & \angle -53.4375° \end{bmatrix}$$

The codebooks A and C for $C_1$ can have a construction matrix taking values from $\{1,-1,j,-j\}$.

Another way to look at the LTE Rel.-10 8Tx codebook is given as follows. The codebook at each rank can be divided into 16 sub-codebooks where each sub-codebook comprises of all precoders derived from a common $W_1$ matrix (or beam group). There can be 16 $W_1$ matrices. The sub-codebook for $W_1^{(k)}$ can be generated by rotating the precoding vectors of the subcodebook corresponding to $W_1^{(0)}$ with a phase rotation matrix $D^k$ and $$D = \begin{bmatrix} \angle 0° & & & & & & & \\ & \angle 22.5° & & & & & & \\ & & \angle 45° & & & & & \\ & & & \angle 67.5° & & & & \\ & & & & \angle 0° & & & \\ & & & & & \angle 22.5° & & \\ & & & & & & \angle 45° & \\ & & & & & & & \angle 67.5° \end{bmatrix}$$

The sub-codebook for $W_1^{(0)}$ can be generated through four vectors, which are referred to as a "construction matrix" below. The four vectors can be the array response vectors corresponding to 4 directions of arrival (DoAs). Each element of the four vectors can be of unity amplitude and the phase of each element can be given below:

$$V = [v_1 \; v_2 \; v_3 \; v_4] = \begin{bmatrix} \angle 0° & \angle 0° & \angle 0° & \angle 0° \\ \angle 0° & \angle 11.25° & \angle 22.5° & \angle 33.75° \\ \angle 0° & \angle 22.5° & \angle 45.0° & \angle 67.5° \\ \angle 0° & \angle 33.75° & \angle 67.5° & \angle 101.25° \end{bmatrix}.$$

$W_1^{(k)}$ (counting k from 0, from 0 to 15) can be given by $$W_1(k) = D^k \begin{bmatrix} V \\ & V \end{bmatrix}_{8 \times 8}.$$

Based on the above discussion, certain embodiments define a new 4Tx codebook by defining rotation matrix D as:

$$D = \begin{bmatrix} \angle 0° & & & \\ & \angle \theta° & & \\ & & \angle 0° & \\ & & & \angle \theta° \end{bmatrix}$$

where θ is a design parameter and θ=22.5° is an example discussed herein.

Certain embodiments also define a construction matrix as:

$$V = [v_1 \; v_2 \; v_3 \; v_4] = \begin{bmatrix} \angle 0° & \angle 0° & \angle 0° & \angle 0° \\ \angle 0° & \angle \beta - \alpha & \angle \beta + \alpha & \angle 2\beta \end{bmatrix}$$

where α and β are design parameters.

FIG. 1 illustrates reference antenna port numbering according to certain embodiments. By observing the 8Tx reference antenna configuration (4 pairs of xpol antennas spaced at half-wavelength), and 4Tx antenna configuration (2 pairs of xpol antennas spaced at half-wavelength), one way to obtain a 4Tx codebook is through truncating or downscaling the 8Tx codebook. From the 8Tx codebook, a downscaled 4Tx codebook (denoted as "1256" below) picking rows 1/2/5/6 of $W_1$ in the 8Tx codebook can be built with $$D = \begin{bmatrix} \angle 0° & & & \\ & \angle 22.5° & & \\ & & \angle 0° & \\ & & & \angle 22.5° \end{bmatrix}$$

and a construction matrix $$V = [\,v_1 \quad v_2 \quad v_3 \quad v_4\,] = \begin{bmatrix} \angle 0° & \angle 0° & \angle 0° & \angle 0° \\ \angle 0° & \angle 11.25° & \angle 22.5° & \angle 33.75° \end{bmatrix},$$

while a downscaled 4Tx codebook (denoted as "1357" below) picking rows 1/3/5/7 of $W_1$ in the 8Tx codebook can be defined by $$D = \begin{bmatrix} \angle 0° & & & \\ & \angle 45° & & \\ & & \angle 0° & \\ & & & \angle 45° \end{bmatrix}$$

and a construction matrix $$V = [\,v_1 \quad v_2 \quad v_3 \quad v_4\,] = \begin{bmatrix} \angle 0° & \angle 0° & \angle 0° & \angle 0° \\ \angle 0° & \angle 22.5° & \angle 45.0° & \angle 67.5° \end{bmatrix},$$

and a downscaled 4Tx codebook (denoted as "1458" below) picking rows 1/4/5/8 of $W_1$ in the 8Tx codebook can be defined by $$D = \begin{bmatrix} \angle 0° & & & \\ & \angle 67.5° & & \\ & & \angle 0° & \\ & & & \angle 67.5° \end{bmatrix}$$

and a construction matrix $$V = [\,v_1 \quad v_2 \quad v_3 \quad v_4\,] = \begin{bmatrix} \angle 0° & \angle 0° & \angle 0° & \angle 0° \\ \angle 0° & \angle 33.75° & \angle 67.5° & \angle 101.25° \end{bmatrix}.$$

In terms of system throughput and cell edge UE throughput, truncation with "1357" performs better than truncation with "1256" and truncation with "1458" performs better than truncation with "1357".

As discussed herein, "1256" can denote a truncation or downscaling scheme of building 4Tx codebook by selecting rows 1/2/5/6 of the LTE Rel.10 8Tx codebook. Similarly, "1357" corresponds to selecting rows 1/3/5/7 and so forth.

The performance difference between "1256", "1357" and "1458" reveals improvement is possible over a simple downscaling of the 8Tx codebook. Thus, a class of codebooks with the following construction matrix can be considered:

$$V = [\,v_1 \quad v_2 \quad v_3 \quad v_4\,] = \begin{bmatrix} \angle 0° & \angle 0° & \angle 0° & \angle 0° \\ \angle 0° & \angle \beta - \alpha & \angle \beta + \alpha & \angle 2\beta \end{bmatrix}$$

and the codebooks given in table 1 have been found to perform well for both closely spaced 4Tx and widely-spaced 4Tx. A first such codebook, which can be obtained from the parameters of codebook C in table 1, is $$D = \begin{bmatrix} \angle 0° & & & \\ & \angle 22.5° & & \\ & & \angle 0° & \\ & & & \angle 22.5° \end{bmatrix}$$

and a construction matrix $$V = [\,v_1 \quad v_2 \quad v_3 \quad v_4\,] = \begin{bmatrix} \angle 0° & \angle 0° & \angle 0° & \angle 0° \\ \angle 0° & \angle 90° & \angle 180° & \angle 270° \end{bmatrix}$$

and $W_1$ (k) is given by $$W_{1,k} = D^k \begin{bmatrix} V & \\ & V \end{bmatrix}_{4 \times 8},$$

while a second such codebook is $$D = \begin{bmatrix} \angle 0° & & & \\ & \angle 22.5° & & \\ & & \angle 0° & \\ & & & \angle 22.5° \end{bmatrix}$$

and a construction matrix $$V = [\,v_1 \quad v_2 \quad v_3 \quad v_4\,] =$$
$$\begin{bmatrix} 1 & 1 & 1 & 1 \\ \angle 53.4375° & \angle 137.8125° & \angle -137.8125° & \angle -53.4375° \end{bmatrix}$$

and $W_1$ (k) is given by $$W_1(k) = D^k \begin{bmatrix} V & \\ & V \end{bmatrix}_{4 \times 8}$$

The first new codebook has a construction matrix taking values from $\{1,-1,j,-j\}$, whereas the second new codebook may perform better with closely spaced antennas.

In Rel-10 8Tx codebook design, a grid of beams design principle was adopted. Specifically for rank 1 and rank 2, there are 16 beam groups, and within each beam group, there are 4 beams which are separated by 11.25°. Also, there are two overlapping beams between adjacent beam groups. Thus, the codebook can be constructed with a building block which consists of 4 beams and a scanning in the direction of arrival (DoA) domain at 16 angles is applied to the building block.

In the design of Rel-12 4Tx codebook design, one starting point may be to downscale the Rel-10 8Tx codebook in a transparent way. To select a downscaled codebook, the following choices may be selected.

First, rows 1, 2, 5, and 6 of the Rel-10 8Tx codebook, which are given by (M=16, θ=22.5°, α=11.25°), can be selected. In the following, this downscaled codebook is denoted as 1256.

Next, rows 1, 3, 5, and 7 of the Rel-10 8Tx codebook, which are given by (M=16, θ=45°, α=22.5°, can be selected. In the following this downscaled codebook is denoted as 1357.

Further, rows 1, 4, 5, and 8 of the Rel-10 8Tx codebook, which are given by (M=16, θ=67.5°, α=33.75°, can be selected. This downscaled codebook is equivalent to (M=16, θ=22.5°, α=33.75°, as both generate the same set of beam groups, but with different indexing. In the following, this downscaled codebook is denoted as "1458".

With the channel models specified for the 3GPP work item in 3GPP TR 36.871 V11.0.0, which is hereby incorporated herein by reference in its entirety, 1458 may outperform 1357, which in turn may outperform 1256. Moreover, a codebook defined by (M=16, θ=22.5°, α=−90° or (M=16, θ=22.5°, α=90°) may perform well.

Thus, a beam separation (α) according to certain embodiments may be around 90°, given the channel models described above. One parameter in the channel model may be the angle spread at the evolved Node B (eNB). In another words, a separation of around 90° may match well with the angle spread of the experienced wireless channel.

However, in certain cases a beam separation (α) at 45° may be used. For example, in certain embodiments, a rank 1 design corresponding to a beam separation (α) at 45° may be used together with a rank 2 design based on the right angle codebook, for example having a beam separation (α) of around 90°.

Thus, if a user equipment (UE) prefers rank 1 transmission, it may be because the angle spread at eNB is small Thus, a small beam separation may be valued in such cases. However, when a UE prefers rank 2 transmission, it may be because the angle spread at eNB is relatively large, and a large angle spread may be valued.

Accordingly, the beam granularity or beam separation (α) for the rank 1 codebook can be different from the beam granularity α for the rank 2 codebook with the following parameters. The rank 1 codebook can be a downscaled codebook from Rel-10 8Tx codebook (for example, "1256") (M=16, θ=22.5°, α=11.25° or (M=16, θ=22.5°, α=22.5° or (M=16, θ=22.5°, α=33.75° or (M=16, θ=22.5°, α=45°.

And rank 2 codebook (for example, the right angle codebook mentioned above) may be (M=16, θ=22.5°, α=90°) or (M=16, θ=22.5°, α=−90°.

Alternatively, the rank 1 codebook can be the downscaled codebook from Rel-10 8Tx codebook (for example, 1256) with (M=16, θ=22.5°, α=11.25° or (M=16, θ=22.5°, α=22.5° or (M=16, θ=22.5°, α=33.75°, and the rank 2 codebook can be (M=16, θ=22.5°, α=45°) or (M=16, θ=22.5°, α=−45°.

The Rel-12 4Tx codebook may be supported with feedback modes as defined in previous releases such periodic feedback modes 1-1 and 2-1. If codebook sampling is used for Rel-12 4Tx codebook as in the case of Rel-10 8Tx codebook, codebook subsampling can be conducted differently for rank 1 and rank 2.

Considering the subsampling of the rank 1 or rank 2 codebook (M=16, θ=22.5°, α=90° (similarly for (M=16, θ=22.5°, α=−90°)), it can be seen that $W_1^{(k+4)}$, $W_1^{(k+8)}$, $W_1^{(k+12)}$ can be obtained from $W_1^{(k)}$ through a permutation of its columns. For example:

$$W_1^{(k+4)} = W_1^{(k)} \begin{bmatrix} 0 & 0 & 0 & 1 & & & & \\ 1 & 0 & 0 & 0 & & & & \\ 0 & 1 & 0 & 0 & & & & \\ 0 & 0 & 1 & 0 & & & & \\ & & & & 0 & 0 & 0 & 1 \\ & & & & 1 & 0 & 0 & 0 \\ & & & & 0 & 1 & 0 & 0 \\ & & & & 0 & 0 & 1 & 0 \end{bmatrix}.$$

Hence the set of rank 1 precoders generated under $W_1^{(k)}$ can be the same as under $W_1^{(k+4)}$, $W_1^{(k+8)}$ and $W_1^{(k+12)}$ (just with different indexing order), the set of rank 2 precoders generated under $W_1^{(k)}$ can contain at least 8 codewords, which are the same as those sets generated under $W_1^{(k+4)}$, $W_1^{(k+8)}$ and $W_1^{(k+12)}$ (they come for $(Y_1, Y_2)$ takes values $\{(\tilde{e}_1,\tilde{e}_1), (\tilde{e}_2,\tilde{e}_2), (\tilde{e}_3,\tilde{e}_3), (\tilde{e}_4,\tilde{e}_4)\}$ and co-phasing terms with $\{1, j\}$).

Then $W_1^{(k)}$, k=0, 1, ..., 15 can be grouped into 4 sets with k taking value from $\{0,4,8,12\}$, $\{1,5,9,13\}$, $\{2,6,10,14\}$, $\{3,7,11,15\}$. Within each set, the same beam vectors can be used. When subsampling is necessary, it can be done in a way so each set is sampled.

Then, for submode 1 in periodic feedback mode 1-1, 3 bits may, for example, be used for $W_1$. The term k can be allowed to take values from $\{0,1,2,3,4,5,6,7\}$. In contrast, the current subsampling scheme for Rel-10 8Tx codebook allows $W_1$ to take values from $\{0,2,4,6,8,10,12,14\}$, which would not perform well for Rel-12 4Tx codebook, as just two sets (i.e. $\{0,4,8,12\}$ and $\{2,6,10,14\}$) given above are sampled. It is also possible to use 2 bits for $W_1$. In one example, k can be allowed to take values from $\{0,1,2,3\}$.

Then, for submode 2 in periodic feed mode 1-1, one codebook subsampling method for $W_1$ can be to select sets of $W_1^{(k)}$'s with non-overlapping beam vectors, such as $\{W_1^{(0)}, W_1^{(1)}, W_1^{(2)}, W_1^{(3)}\}$, or $\{W_1^{(4)}, W_1^{(5)}, W_1^{(6)}, W_1^{(7)}\}$, or $\{W_1^{(2)}, W_1^{(3)}, W_1^{(4)}, W_1^{(5)}\}$, or the like. Consequently two bits may be enough to represent the choices of $W_1$, and two bits may be used for choices of $W_2$. In contrast, in the current LTE specification, for the Rel-10 8Tx codebook, 3 bits are used for $W_1$ and 1 bit is used for $W_2$, which may be an optimal tradeoff between $W_1$ and $W_2$ subsampling for the Rel-12 4Tx codebook.

Figure 2:
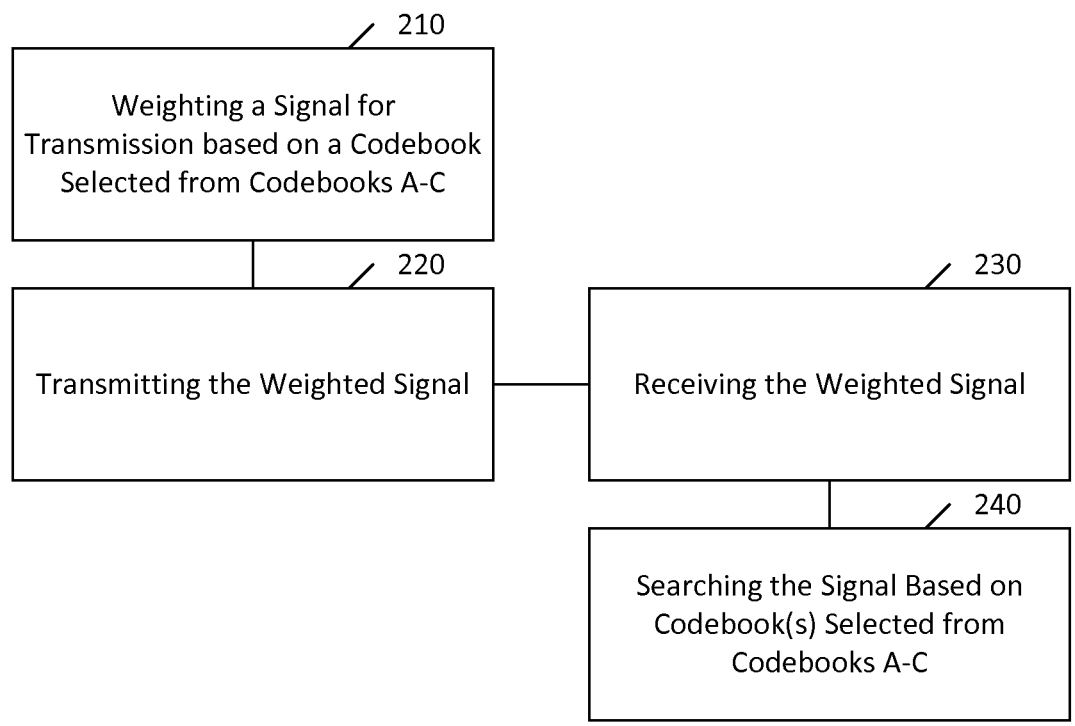
FIG. 2 illustrates a method according to certain embodiments.

FIG. 2 illustrates a method according to certain embodiments. As shown in FIG. 2, a method may include, at 210, weighting a signal for transmission based on a precoder selected according to a feedback from a codebook selected from the codebooks described above, for example at table 1. The signals can be weighted to be sent as a DL-MIMO transmission, for example a multi-user DL-MIMO transmission.

The method can also include, at 220, sending the weighted signal. The sending the signal can be performed by an access point device such as a base station, for example an eNode B (eNB), using an antenna array or array of antenna elements.

The method can further include receiving, at 230, the weighted signal. The weighted signal can be received at a user equipment, such as a mobile phone, smart phone, laptop computer, tablet computer, smart meter, sensor, or other device.

The method can additionally include searching, at 240, the signal based on one or more codebooks, including a codebook selected from codebooks described above.

Figure 3:
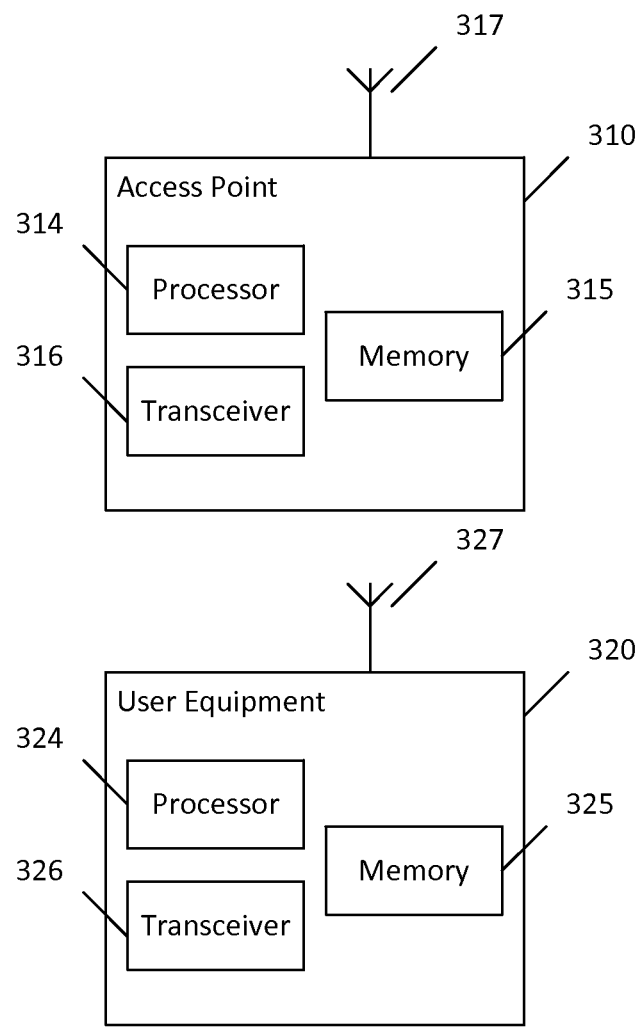
FIG. 3 illustrates a system according to certain embodiments.

FIG. 3 illustrates a system according to certain embodiments of the invention. In one embodiment, a system may comprise several devices, such as, for example, access point 310 and UE 320. The system may comprise more than one UE 320 and more than one access point 310, although only one of each is shown for the purposes of illustration. The system may also involve only at least two UEs 320 or only at least two access points 310. An access point can be a base station, eNode B (eNB) or other network access element. Each of these devices may comprise at least one processor, respectively indicated as 314 and 324. At least one memory may be provided in each device, and indicated as 315 and 325, respectively. The memory may comprise computer program instructions or computer code contained therein. One or more transceiver 316 and 326 may be provided, and each device may also comprise an antenna, respectively illustrated as 317 and 327. Although only one antenna each is shown, many antennas and multiple antenna elements may be provided to each of the devices. Other configurations of these devices, for example, may be provided. For example, access point 310 and UE 320 may be additionally configured for wired communication, in addition to wireless communication, and in such a case antennas 317 and 327 may illustrate any form of communication hardware, without being limited to merely an antenna.

Transceivers 316 and 326 may each, independently, be a transmitter, a receiver, or both a transmitter and a receiver, or a unit or device that may be configured both for transmission and reception.

Processors 314 and 324 may be embodied by any computational or data processing device, such as a central processing unit (CPU), application specific integrated circuit (ASIC), or comparable device. The processors may be implemented as a single controller, or a plurality of controllers or processors.

Memories 315 and 325 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language.

The memory and the computer program instructions may be configured, with the processor for the particular device, to cause a hardware apparatus such as access point 310 and UE 320, to perform any of the processes described above (see, for example, FIG. 2). Therefore, in certain embodiments, a non-transitory computer-readable medium may be encoded with computer instructions that, when executed in hardware, may perform a process such as one of the processes described herein. Alternatively, certain embodiments of the invention may be performed entirely in hardware.

Furthermore, although FIG. 3 illustrates a system including an access point 310 and a UE 320, embodiments of the invention may be applicable to other configurations, and configurations involving additional elements, as illustrated and discussed herein. For example, multiple user equipment devices and multiple access points may be present, or other nodes providing similar functionality, such as relay nodes that may receive data from an access point and forward the data to a UE and may implement both functionality of the UE and functionality of the access point.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

GLOSSARY

2TX Two Transmitters
4TX Four Transmitters
8TX Eight Transmitters
DL-MIMO Downlink Multiple-Input Multiple-Output
CSI Channel State Information
UE User Equipment
TM Transmission Mode
CB Codebook
PUSCH Physical Uplink Shared Channel
CQI Channel Quality Indicator
PMI Precoding Matrix Indicator
DMRS Demodulation Reference Signal
MU Multi-user
LTE Long Term Evolution of 3GPP
3GPP Third Generation Partnership Project
DoA Direction of Arrival
eNB evolved Node B
Rel. Release
Xpol. Cross Polarization

We claim:
1. An apparatus, comprising:
at least one processor; and
at least memory including computer program code,
wherein the at least one memory and the computer program code are configured to, with the at least one processor, cause the apparatus at least to
weigh a signal for transmission based on a precoder selected from a dual codebook according to a feedback, codewords of the dual codebook constructed using a product of a matrix of a first codebook and a matrix of a second codebook, the first codebook constructed according to

$$D^k \begin{bmatrix} V \\ V \end{bmatrix},$$

where k is an index, rotation matrix D as a function of θ is $$D = \begin{bmatrix} \angle 0° & & & \\ & \angle \theta° & & \\ & & \angle 0° & \\ & & & \angle \theta° \end{bmatrix}$$

where θ is a design parameter and wherein the first codebook is constructed from a construction matrix V defined as $$V = \begin{bmatrix} v_1 & v_2 & v_3 & v_4 \end{bmatrix} = \begin{bmatrix} \angle 0° & \angle 0° & \angle 0° & \angle 0° \\ \angle 0° & \angle \beta - \alpha & \angle \beta + \alpha & \angle 2\beta \end{bmatrix}$$

where α and β are design parameters; and
send the weighted signal.

2. The apparatus of claim 1, wherein α and β are separated by 90 degrees.

3. The apparatus of claim 1, wherein each of α and β is selected from −135°, −45°, 45°, and 135°.

4. The apparatus of claim 1, wherein the signals are weighted to be sent as a DL-MIMO transmission.

5. The apparatus of claim 1, wherein the signals are weighted to be sent as a multi-user DL-MIMO transmission.

6. The apparatus of claim 1, wherein the apparatus comprises an access point, a base station, an eNode B or a network access element.

7. An apparatus, comprising:
at least one processor; and
at least memory including computer program code,
wherein the at least one memory and the computer program code are configured to, with the at least one processor, cause the apparatus at least to
receive the weighted signal; and
search the weighted signal based on a dual codebook, codewords of the dual codebook constructed from the product of a first codebook and a second codebook, the first codebook constructed according to $$D^k \begin{bmatrix} V \\ & V \end{bmatrix},$$

where k is an index, rotation matrix D as a function of θ is $$D = \begin{bmatrix} \angle 0° & & & \\ & \angle \theta° & & \\ & & \angle 0° & \\ & & & \angle \theta° \end{bmatrix}$$

where θ is a design parameter and wherein the first codebook is constructed from a construction matrix V defined as $$V = \begin{bmatrix} v_1 & v_2 & v_3 & v_4 \end{bmatrix} = \begin{bmatrix} \angle 0° & \angle 0° & \angle 0° & \angle 0° \\ \angle 0° & \angle \beta - \alpha & \angle \beta + \alpha & \angle 2\beta \end{bmatrix}$$

where α and β are design parameters.

8. The apparatus of claim 7, wherein α and β are separated by 90 degrees.

9. The apparatus of claim 7, wherein each of α and β is selected from −135°, −45°, 45°, and 135°.

10. The apparatus of claim 7, wherein the signals are weighted to be sent as a DL-MIMO transmission.

11. The apparatus of claim 7, wherein the signals are weighted to be sent as a multi-user DL-MIMO transmission.

12. The apparatus of claim 7, wherein the apparatus comprises a mobile phone, smart phone, laptop computer, tablet computer, smart meter, or sensor.

13. An apparatus, comprising:
at least one processor; and
at least memory including computer program code,
wherein the at least one memory and the computer program code are configured to, with the at least one processor, cause the apparatus at least to
determine a feedback signal for transmission based on a precoder selected from a dual codebook, codewords of the dual codebook constructed using a product of a matrix of a first codebook and a matrix of a second codebook, the first codebook constructed according to $$D^k \begin{bmatrix} V \\ & V \end{bmatrix},$$

where k is an index, rotation matrix D as a function of θ is $$D = \begin{bmatrix} \angle 0° & & & \\ & \angle \theta° & & \\ & & \angle 0° & \\ & & & \angle \theta° \end{bmatrix}$$

where θ is a design parameter and wherein the first codebook is constructed from a construction matrix V defined as $$V = \begin{bmatrix} v_1 & v_2 & v_3 & v_4 \end{bmatrix} = \begin{bmatrix} \angle 0° & \angle 0° & \angle 0° & \angle 0° \\ \angle 0° & \angle \beta - \alpha & \angle \beta + \alpha & \angle 2\beta \end{bmatrix},$$

where α and β are design parameters; and
send the feedback signal.

14. The apparatus of claim 13, wherein α and β are separated by 90 degrees.

15. The apparatus of claim 13, wherein each of α and β is selected from −135°, −45°, 45°, and 135°.

16. The apparatus of claim 13, wherein the signals are weighted to be sent as a DL-MIMO transmission.

17. The apparatus of claim 13, wherein the signals are weighted to be sent as a multi-user DL-MIMO transmission.

18. The apparatus of claim 13, wherein the apparatus comprises a mobile phone, smart phone, laptop computer, tablet computer, smart meter, or sensor.

* * * * *